(12) United States Patent
Huang et al.

(10) Patent No.: US 8,523,981 B2
(45) Date of Patent: Sep. 3, 2013

(54) HYDROPHOBIC OZONE-STABLE MEMBRANE MADE OF POLYVINYLIDENE FLUORIDE

(75) Inventors: Quan Huang, Schwelm (DE); Karl Bauer, Dammbach (DE); Phung Duong, Essen (DE); Oliver Schuster, Gevelsberg (DE)

(73) Assignee: Membrana GmbH, Wuppertal (DE)

( * ) Notice: Subject to any disclaimer, the term of this patent is extended or adjusted under 35 U.S.C. 154(b) by 287 days.

(21) Appl. No.: 13/132,941

(22) PCT Filed: Dec. 7, 2009

(86) PCT No.: PCT/EP2009/066472
§ 371 (c)(1),
(2), (4) Date: Jun. 6, 2011

(87) PCT Pub. No.: WO2010/066654
PCT Pub. Date: Jun. 17, 2010

(65) Prior Publication Data
US 2011/0239865 A1    Oct. 6, 2011

(30) Foreign Application Priority Data

Dec. 12, 2008 (EP) .................................... 08171473

(51) Int. Cl.
*B01D 53/22* (2006.01)
*B01D 19/00* (2006.01)
*B01D 71/34* (2006.01)
*B01D 69/08* (2006.01)
*D01D 5/247* (2006.01)

(52) U.S. Cl.
USPC .................. 96/6; 96/10; 96/12; 95/45; 95/46; 95/47; 264/209.7

(58) Field of Classification Search
USPC .................. 96/4, 6, 8, 10, 12; 95/45, 46, 47, 95/51, 54; 264/178 R, 209.1, 209.7
See application file for complete search history.

(56) References Cited

U.S. PATENT DOCUMENTS

| 3,558,764 A | 1/1971 | Isaacson et al. |
| 4,664,681 A | 5/1987 | Anazawa et al. |

(Continued)

FOREIGN PATENT DOCUMENTS

| DE | 2737745 | 3/1978 |
| EP | 0133882 A2 | 3/1985 |

(Continued)

*Primary Examiner* — Jason M Greene
(74) *Attorney, Agent, or Firm* — Hammer & Associates, P.C.

(57) ABSTRACT

The invention relates to a hydrophobic, integrally asymmetrical hollow-fiber membrane made of a vinylidene fluoride homopolymer or copolymer, wherein the wall of the membrane has a microporous supporting layer having a sponge-like, open-pored, essentially isotropic pore structure without finger pores, the supporting layer extending across at least 90% of the wall thickness and having pores with an average diameter of less than 0.5 µm. The hollow-fiber membrane is characterized in that it has a separating layer adjacent to the supporting layer on its outer surface and that it has an outer surface with a homogeneous, uniform structure without pores, a porosity in the range from 40 to 80 vol. %, a wall thickness from 25 to 100 µm, a diameter of the lumen of the hollow-fiber membrane from 100 to 500 µm, a permeability for nitrogen of at least 25 ml/(cm$^2$·min·bar), and an elongation at break of at least 250%. The invention further relates to a method for producing hollow-fiber membranes of this type.

14 Claims, 7 Drawing Sheets

(56) References Cited

U.S. PATENT DOCUMENTS

| | | | |
|---|---|---|---|
| 5,489,406 A * | 2/1996 | Beck et al. | 264/209.1 |
| 5,514,461 A | 5/1996 | Meguro et al. | |
| 5,736,051 A | 4/1998 | Degen et al. | |
| 6,497,752 B1 | 12/2002 | Kessler et al. | |
| 7,662,212 B2 * | 2/2010 | Mullette et al. | 95/45 |
| 2004/0050791 A1 * | 3/2004 | Herczeg | 210/651 |
| 2004/0135274 A1 | 7/2004 | Matsuda et al. | |
| 2005/0029186 A1 * | 2/2005 | Muller | 96/4 |
| 2006/0138038 A1 * | 6/2006 | Proulx et al. | 96/4 |
| 2012/0247327 A1 * | 10/2012 | Omole | 95/51 |

FOREIGN PATENT DOCUMENTS

| | | |
|---|---|---|
| EP | 0378441 A2 | 7/1990 |
| EP | 0734759 A1 | 10/1996 |
| EP | 1230970 A1 | 8/2002 |
| WO | WO 93/22034 A1 | 11/1993 |
| WO | WO 02/058828 A1 | 8/2002 |

* cited by examiner

HYDROPHOBIC OZONE-STABLE MEMBRANE MADE OF POLYVINYLIDENE FLUORIDE

The invention relates to a hydrophobic hollow-fiber membrane made of a vinylidene fluoride homopolymer or copolymer which has a wall with an outer surface on its outer side and an inner surface on its inner side and with a wall thickness, and a lumen enclosed by the inner side, wherein the wall of said hollow-fiber membrane has a microporous supporting layer with a sponge-like, open-pored pore structure that is isotropic across the wall thickness and without finger pores and said supporting layer extends across at least 90% of the wall thickness and has pores with an average diameter of less than 0.5 µm. The invention further relates to a method for producing membranes of this type.

Water with a high degree of purity is necessary for the most varied of industrial processes e.g. in the pharmaceutical industry or the semiconductor industry. The requirements regarding the quality of the water do not only refer hereby to purity with respect to e.g. particulate components or solutes, but also with respect to gases dissolved in water, which can lead to negative effects in a number of applications. Examples of dissolved gases of this type are oxygen, carbon dioxide, or ammonia. Oxygen has an oxidative effect which, for example, can lead to corrosion problems upon contact with carbon steels in boiler feed water or closed cooling water circuits. In addition, the presence of oxygen can accelerate microbial growth. During the production of ultrapure water, the presence of carbon dioxide can lead to the formation of carbonic acid and, during dissociation of the carbonic acid, to an increase in the conductivity of the water and to stress e.g. on ion exchange systems.

To remove these gases, membrane contactors are used to an increasing degree, said contactors usually contain bundles of hollow-fiber membranes. Generally, hollow-fiber membranes are used for this that are made from hydrophobic polyolefins, such as polypropylene, poly(4-methyl-1-pentene), or HDPE. Membranes of these types are described for example in U.S. Pat. Nos. 3,558,764, 4,664,681, or 6,497,752. During the degassing via membrane contactors, the water to be degassed generally flows through the membrane bundle on the outer side, i.e. it overflows the outer sides of the hollow-fiber membranes contained in the membrane contactor. To remove the gas, a stripping gas flows through the hollow-fiber membranes on the lumen side or a vacuum is applied to the lumen side. In the latter case in particular, the hollow-fiber membranes are subjected to considerable compressive loads.

In addition to applications for degassing liquids, such as water, there are also numerous applications in which liquids are impinged with certain gases, i.e. they are gassed. The principles for these gassing processes are inversely similar to those for degassing.

With respect to many applications in the field of degassing or gassing, the material characteristics of the hollow-fiber membranes used up until now, those based on polyolefins, have been insufficient. In particular, a weak point of these membranes from the prior art is their low resistance to oxidation means, such as ozone or chlorine. Their acid resistance is also often not sufficient in application.

It is known that membranes made from polyvinylidene fluoride have good chemical and thermal resistance as well as good mechanical characteristics. Membranes made from polyvinylidene fluoride are disclosed for example in EP-A-0 378 441. The membranes from EP-A-0 378 441 have a uniform and three-dimensional network-like pore structure, do not have macrovoids in the membrane wall interiors, i.e. do not have pores with a diameter of 10 µm or larger, and have pores with an average diameter in the range from 0.05 µm to smaller than 5 µm on both membrane surfaces. The membranes from EP-A-0 378 441 are designed for applications primarily in the field of microfiltration.

Flat membranes made from polyvinylidene fluoride with an asymmetric structure and continuous pores are described in U.S. Pat. No. 5,514,461. The pores on the opposite sides of the membrane have different average diameters, which differ by at least a factor of 4. The maximum pore diameter, determined by means of the bubble point method, lies in the range between approximately 0.01 and 10 µm, i.e. the ultra-filtration and micro-filtration ranges are covered by these membranes.

U.S. Pat. No. 5,736,051 relates to skinless membranes made from polyvinylidene fluoride having an isotropic, i.e. a substantially uniform and symmetrical pore structure over the entire membrane wall. The membranes from U.S. Pat. No. 5,736,051 are typically provided for applications in the field of ultrafiltration and especially e.g. for the removal of viruses from liquids. They are provided with a surface coating in order to make the membrane hydrophilic and thus less susceptible to adsorption of proteins.

In EP-A-0 734 759, hollow-fiber membranes made from polyvinylidene fluoride are disclosed having a network-like or fibrous structure, in which a plurality of polymer fibers are connected to each other at a plurality of points along each fiber. The length of the polymer fibers is thereby substantially greater than their thickness. Preferably, the polymer fibers for the hollow-fiber membranes of EP-A-0 734 759 are oriented in the longitudinal direction of the hollow-fiber membranes. According to the scanning electron microscopic images shown in EP-A-0 734 759, the hollow-fiber membranes have openings on their surfaces. With respect to the membrane structure, EP-A-0 734 759 delimits itself from known membranes which have a sponge-like structure with cellular pores connected to each other via openings. Regarding the method disclosed for producing the hollow-fiber membranes in EP-A-0 734 759, it is a method using thermally induced phase separation. The distinctive feature of the method of EP-A-0 734 759 lies in that the hollow fiber, which is shaped leaving the hollow-fiber die, is initially encased on its outer side with a coating liquid which has substantially the same temperature as the extruded hollow fiber. After traversing a dwell section, the hollow fiber is cooled in a cooling region by means of a cooling liquid to form the membrane structure.

EP-A-0 133 882 likewise discloses a method for producing inter alia hollow-fiber membranes made from polyvinylidene fluoride via a process using thermally induced phase separation. In this method, the polymer solution emerging from the hollow-fiber die is fed for cooling through a tube bent in a U-shape filled with a cooling medium, wherein preferably water is used as the cooling medium. In the first leg of the U-tube, under conditions by means of which the mechanical stress of the hollow fiber traversing the U-tube is kept as low as possible, cooling takes place, a phase separation results from this, and a subsequent at least partial solidification of the polymer-rich phase takes place. After at least partial solidification of the polymer-rich phase, the hollow fiber is deflected at the end of the first leg and is fed from the bottom up through the second leg of the U-tube. The hollow-fiber membranes of EP-A-0 133 882 can have an isotropic pore structure or can also have an anisotropic pore structure with a gradient in the direction from the surface into the interior of the hollow-fiber membrane and have pores on each of its surfaces. For the examples of polyvinylidene fluoride membranes produced from EP-A-0 133 882, maximum pore sizes of 0.58 μm and 0.94 μm were determined according to the bubble point method. Applications cited for the membranes from EP-A-0 133 882 are the microfiltration of aqueous solutions or solutions in organic solvents and the transmembrane distillation for concentrating aqueous solutions.

US-A-2004/0135274 relates to membranes made from vinylidene fluoride homopolymers or copolymers which are likewise produced via a method with thermally induced phase separation. The membranes from US-A-2004/0135274 have an isotropic network structure with three-dimensional branchings in random spatial directions and the targeted membranes are those which have porous surfaces. According to statements in US-A-2004/0135274, this structure differs from structures of membranes which were produced according to the so-called wet-spinning process, i.e. according to methods in which the phase separation is induced solely by submerging the polymer solution in a non-solvent, as well as from particulate network structures or cellular structures. An embodiment of the membranes from US-A-2004/0135274 concerns hollow-fiber membranes, during the production of which it is advantageous that they be cooled by direct contact with a liquid cooling medium. In this case, the solvent used to produce the polymer solution is also preferably used as a cooling medium. In cases in which the cooling medium has a low affinity for vinylidene fluoride homopolymers or copolymers, the surface of the resulting membrane has a skin-like structure or a structure consisting of a particulate material. This is the case, according to statements from US-A-2004/0135274, when using very good solvents for the vinylidene fluoride homopolymer or copolymer or when using water, ethylene glycol, or decalin. In these cases, the desired open-pored surfaces are achieved by drawing. In the accompanying figures, the surfaces have a particulate or spherulitic structure.

Even though the membranes made from polyvinylidene fluoride described in the prior art have a high chemical and thermal resistance, i.e. characteristics which are also desirable for applications in the field of degassing or gassing, they cannot be used in the field of degassing or gassing due to their pore structure.

Therefore, there is a need for hollow-fiber membranes for degassing or gassing which have a high oxidation resistance and/or a high chemical resistance and at the same time have a high mechanical strength and good thermal stability.

It is therefore the object of the present invention to provide a hollow-fiber membrane suitable for degassing or gassing having improved characteristics over the hollow-fiber membranes of the prior art. In addition, it is the object of the present invention to provide a method for producing improved membranes of this type.

The object is achieved on the one hand by a hydrophobic, integrally asymmetrical hollow-fiber membrane made from a vinylidene fluoride homopolymer or copolymer, which has a wall with an outer surface on its outer side, an inner surface on its inner side, and a wall thickness, as well as a lumen enclosed by the inner side, wherein the wall of the hollow-fiber membrane has a microporous supporting layer with a sponge-like, open-pored pore structure that is essentially isotropic across the wall thickness and without finger pores, and wherein the supporting layer extends across at least 90% of the wall thickness and its pores have an average diameter of less than 0.5 μm, wherein the hollow-fiber membrane is characterized in that said hollow-fiber membrane has in the wall a separating layer adjacent to the supporting layer on the outer surface thereof, the separating layer having a thickness in the range from 0.01 to 5 μm and a structure that is denser in comparison with the supporting layer, and the outer surface under scanning electron microscopic examination at 5000× magnification has a homogeneous, uniform structure without pores, and that said hollow-fiber membrane has a porosity in the range from 40 to 80 vol. %, a wall thickness in the range from 25 to 100 μm, a lumen diameter of 100 to 500 μm, as well as a permeability for nitrogen of at least 25 ml/(cm$^2$·min·bar) and an elongation at break of at least 250%.

Within the context of the present invention, an integrally asymmetrical membrane is understood to be a membrane in which the separating layer and supporting layer consist of the same material and were formed directly together during the membrane production, by which means both layers are connected to each other as an integral unit. A change takes place only with regards to the membrane structure at the transition from the separating layer to the supporting layer. In contrast thereto are, for example, composite membranes which have a multi-layered structure in which, in a separate method step, a dense layer is applied as a separating layer to a porous, often microporous supporting layer or supporting membrane. This results in that the materials that form the supporting layer and the separating layer in composite membranes also have different characteristics.

The special structure of the hollow-fiber membranes according to the invention, in particular the microporous supporting layer with a sponge-like, open-pored pore structure without finger pores, said supporting layer extending over at least 90% of the wall thickness and comprising pores having an average diameter of less than 0.5 μm, and the homogeneous, uniform, and smooth structure of the outer surface are the basis of the high strength and good mechanical characteristics of the membranes in application. Due to this structure, the membranes according to the invention differ from membranes having an asymmetric structure in which the pore size changes even within the supporting layer, and also from membranes whose surfaces and/or whose supporting structure have a particulate or spherulitic structure. These membranes from the prior art often have insufficient mechanical characteristics due to their different structure.

The homogeneous, isotropic structure of the supporting layer of the hollow-fiber membranes according to the invention effects a uniform distribution of the loads across the membrane wall during mechanical stress, which distribution leads to high pressure stabilities, high breaking tenacities, and high elongations at break. With regard to the mechanical characteristics, it is simultaneously important that the size of the pores in the supporting layer remains in the stated range. In particular, the supporting structure should not have any finger pores, which are often termed caverns or macrovoids and can have a size of up to several μm; instead, the supporting structure should have pores whose average diameter is smaller than 0.5 μm, such that the supporting layer is thus relatively finely pored. Preferably, the average diameter of the pores in the supporting layer is less than 0.1 μm.

The pore structure in the supporting layer is substantially isotropic according to the invention. By this it is understood on the one hand that the average diameter of the pores in the supporting layer is substantially constant when viewed across the wall thickness using a scanning electron microscopic examination at 5000× magnification. Expressed another way, the region of the isotropic support structure can be viewed as a region in which flow channels with substantially constant diameters are present across the wall thickness. Naturally, the fact that the actual size of the pores in the isotropic supporting layer varies somewhat should also be taken into account, i.e. the supporting layer has, to a certain extent, a pore size distribution as is applicable for every membrane structure, even if the structure appears isotropic in the scanning electron microscopic examination. Within the context of the present invention, therefore, a substantially constant average pore diameter is understood as one that does not change by more than +/−50% over the extension of the supporting layer over the membrane wall.

On the other hand, a substantially isotropic pore structure is to be understood such that even if the individual pores can also have an irregular or oblong form, when averaged over all the pores, the pores in all spatial directions have substantially the same extension, whereby deviations among the extensions in the individual spatial directions of up to 20% are included. The membranes according to the invention thereby have a cellular structure which exhibits pores surrounded by pore walls with in part spherical and ellipsoidal shapes, which are connected to each other via openings in their wall. The present structure thus differs for example from network structures having three-dimensional branchings randomly oriented in the spatial directions, such as the microporous membranes from US-A-2004/0135274 or EP-A-0 734 759, to which explicit reference is made regarding this disclosure. On the other hand, the pore structure of the membranes of the present invention differs from particulate or spherulitic structures, in which the polymer structure of the membrane is formed by spherical or spherulitic particles which can be connected to each other via fibril-like webs. Membranes with this type of structure are described e.g. in EP-A-1 230 970 or WO-A-93/22034, or disclosed in US-A-2004/0135274, FIG. 6, to which explicit reference is made regarding this disclosure at this point.

According to the invention, the porosity of the hydrophobic hollow-fiber membranes lies in the range from 40 to 80 vol. %. Porosities above 80 vol. % disadvantageously affect the mechanical characteristics of the membranes. In particular, a severe decrease in the pressure stabilities of the hollow-fiber membranes occurs at higher porosities. Porosities below 40 vol. % lead to a significant decrease in the permeabilities of the membranes, which decrease can also no longer be recovered by a reduction in the separating layer thickness. Preferably, the hollow-fiber membranes have a porosity in the range from 45 to 60 vol. %.

As previously explained, the hollow-fiber membranes according to the invention have high strength and good mechanical characteristics based on their particular structure. Preferably, the membranes according to the invention have a breaking tenacity of at least 15 N/mm$^2$ and particularly preferably of at least 19 N/mm$^2$ as determined in the tensile test. In a likewise preferred embodiment, the hollow-fiber membranes according to the invention have an elongation at break of 250 to 600% and particularly preferably an elongation at break of 300 to 500%.

While the risk of imperfections becomes too great when the thicknesses of the separating layer are too low, on the other hand, transfer rates and permeabilities for the degassing or gassing become too low due to a separating layer thickness that is too large. Therefore, the thickness of the separating layer preferably lies between 0.01 µm and 5 µm and particularly preferably between 0.1 µm and 2 µm. Membranes according to the invention having a separating layer thickness between 0.1 µm and 0.6 µm are superbly suitable. The thickness of the separating layer can be determined for the membranes according to the invention in a simple way by measuring the layer using fracture patterns created by means of scanning electron microscopy or by means of ultra-thin section characterization created by means of transmission electron microscopy.

The homogeneous, isotropic structure of the supporting layer with microporous pore structure, in connection with a separating layer whose thickness lies within the range required according to the invention, is critical for sufficiently high permeabilities for gases in the application of the membrane according to the invention during the gassing and degassing of liquids. The hollow-fiber membranes of the invention therefore have a permeability for nitrogen of at least 25 ml/(cm$^2$·min·bar). Preferably, the permeability for nitrogen is at least 40 ml/(cm$^2$·min·bar).

As explained, a separating layer having a structure that is denser in comparison with the supporting layer is located on the outer side of the membranes of the invention. The outer surface has a homogeneous, uniform structure under examination using scanning electron microscopy at 5000× magnification, and no pores are discernible at this magnification. In the context of the present invention, a homogeneous, uniform structure of the surface is understood to be a surface on which no macro-structure is discernible with structural elements such as spherulites, particles, or needle shaped elements or fibril elements, or with network-like structural elements, such as occur on membranes that are also open-pored on their surfaces. Membranes having structural elements of this type on their surfaces are, e.g. disclosed in WO-A-93/22034. The outer surface of the hollow-fiber membranes according to the invention appears smooth in contrast. Preferably, it has an average roughness $R_a$, determined using atomic force microscopy on 10×10 µm sections of the membrane surface, of less than 100 nm and particularly preferably of less than 60 nm, In particular, with respect to the applications in the fields of gassing and degassing of liquids, the hollow-fiber membranes according to the invention preferably have a wall thickness in the range from 35 to 75 µm. Likewise, hollow-fiber membranes are preferred whose lumen diameter lies in the range from 150 to 350 µm. Hollow-fiber membranes according to the invention of this type show a particularly balanced relation regarding permeabilities on the one hand and mechanical characteristics on the other hand.

The hollow-fiber membranes according to the invention can be produced by means of a method in which the membrane formation takes place via a thermally induced phase separation process.

The object is therefore further achieved by a method for producing a hydrophobic hollow-fiber membrane of this type made from a vinylidene homopolymer or copolymer, wherein the method comprises at least the following steps:

a) production of a homogeneous solution of 20-60 wt. % of a polymer component consisting of at least one vinylidene fluoride homopolymer or copolymer in 80-40 wt. % of a solvent system, wherein the solution made from polymer component and the solvent system upon cooling has a critical demixing temperature and a solidification temperature, and a miscibility gap below the critical demixing temperature in the liquid state of aggregation, b) shaping the solution into a hollow fiber with an outer surface on its outside and an inner surface on its inner side in a hollow-fiber die which has a die temperature above the critical demixing temperature, c) cooling the hollow fiber by means of a cooling medium, which is conditioned to a cooling temperature below the solidification temperature, at such a rate that a thermodynamic non-equilibrium liquid-liquid phase separation takes place into a polymer-rich and a polymer-poor phase, and subsequently upon passing below the solidification temperature, solidification of the polymer-rich phase takes place, d) removal of the solvent system from the hollow fiber, if necessary, wherein the method is characterized in that
the solvent system contains a compound A and a compound B which are liquid and can be mixed homogeneously with each other at the dissolving temperature, and wherein a solvent for the polymer component is selected for compound A and a non-solvent for the polymer component is selected for compound B,
the hollow fiber is brought into contact at its outer surface with a liquid cooling medium for cooling which does not react chemically with the polymer component and which is a strong non-solvent for the polymer component, for which non-solvent the demixing temperature of a system which consists of 30 wt. % of the polymer component, 40 wt. % of the compound A used as a solvent, and 30 wt. % of the cooling medium lies, in relation to the solidification temperature, at least 25% above the solidification temperature of this system, and
the cooling medium contains compound B.

Surprisingly, it has been shown that by maintaining these process conditions, integrally asymmetrical hollow-fiber membranes made from a vinylidene fluoride homopolymer or copolymer are obtained, which membranes have a microporous supporting layer and a separating layer adjacent to the supporting layer and covering the same on its outer side, wherein the outer surface of the hollow-fiber membrane has a homogeneous, uniform structure and no pores. It has been shown here that in particular the selection of the cooling medium influences the formation of the membrane structure and in particular influences the formation of the surface structure.

The method of the invention is based on a thermally induced phase separation process with liquid-liquid phase separation. According to the invention, the polymer component and the solvent system containing the compounds A and B form a binary system which has a range in the liquid state of aggregation in which the system is present as a homogeneous solution, and a range in which it has a miscibility gap. If a system of this type is cooled outside of the range in which it is present as a homogeneous solution, below the critical demixing or phase separation temperature, then initially a liquid-liquid demixing or phase separation into two liquid phases takes place, namely into a polymer-rich phase and a polymer-poor phase. During further cooling to below the solidification temperature, the polymer-rich phase solidifies into the three-dimensional membrane structure. Within the context of the present invention, the solidification temperature of the system made from the polymer component and compounds A and B lies preferably above 50° C. and particularly preferably above 100° C. If the cooling rate is sufficiently high that the liquid-liquid phase separation cannot take place under thermodynamic equilibrium conditions but instead takes place under thermodynamic non-equilibrium conditions, yet on the other hand if the cooling rate is still relatively slow enough, the liquid-liquid phase separation takes place approximately simultaneously with the formation of a plurality of liquid droplets of essentially the same size. The resulting polymer structure then has a sponge-like, cellular, and open-pored microstructure. The different types of formation of such sponge-like, microporous structures using processes with thermally induced liquid-liquid phase separation are extensively described in DE-A 27 37 745, to which explicit reference is made regarding this disclosure, and presented e.g. in R. E. Kesting: "Synthetic Polymeric Membranes", John Wiley & Sons, 1985, pp. 261-264.

Within the context of the present invention, vinylidene fluoride homopolymers or vinylidene fluoride copolymers are used as membrane-forming polymers. Copolymers of vinylidene fluoride with at least one further component, selected from the group of ethylene tetrafluorides, propylene hexafluorides, ethylene trifluorides, ethylene trifluoride chlorides, vinyl fluoride, and ethylene are possible vinylidene fluoride copolymers. Mixtures of two or more vinylidene homopolymers and/or copolymers can also be used. Preferably, within the context of the present invention, vinylidene fluoride homopolymers are used. Preferably the vinylidene fluoride homopolymers or vinylidene fluoride copolymers have an average molecular weight $M_w$, measured using gel permeation chromatography, of at least $1 \times 10^5$ daltons. At average molecular weights $M_w$ lower than $1 \times 10^5$ daltons, the solutions produced therewith to produce the hollow-fiber membranes have a viscosity that is too low and the hollow-fiber membranes produced therefrom have debased mechanical characteristics. Particularly preferred are average molecular weights $M_w$ in the range from $1.5 \times 10^5$ to $1 \times 10^6$ daltons. In the case in which mixtures of two or more vinylidene fluoride homopolymer and/or copolymer components are used, these can also have different molecular weights. In so far as it is necessary, the vinylidene fluoride homopolymers or vinylidene fluoride copolymers can also contain additives such as antioxidants, UV absorbers, lubricants, or nucleating agents.

The compositions used, made from the polymer component, compound A, and compound B, wherein compounds A and B together form the solvent system, must be jointly convertible into a single, homogeneous liquid phase and have a critical demixing temperature, below which a phase separation into two liquid phases occurs. This temperature, however, is higher than the demixing temperature of a solution that contains equal proportions of polymer, yet only contains compound A as the solvent system. For systems of polymer component/compound A with a miscibility gap in the liquid state of aggregation, the critical demixing temperature is thus raised by the addition of compound B. The addition of compound B enables a targeted control of the pore size and the pore volume in the porous structures obtained.

Compounds of a type are to be used for compound A that are solvents for the polymer component and this polymer component is dissolved completely in these compounds into a homogeneous solution during heating to at most the boiling point of this compound. According to the invention, a compound is selected as compound B which is a non-solvent for the polymer component. A non-solvent for the polymer component is generally understood within the context of the present invention to be a compound which does not dissolve the polymer component, at a concentration of 1 wt. % in the non-solvent, into a homogeneous solution during heating to at most the boiling point of this non-solvent.

Compound A can thereby have been mixed with further solvents. Compound B can also be used in a mixture with additional non-solvents. As a result, in the context of the present invention, compound A is understood as not only a single compound, but also as a mixture of different solvents, as long as the cumulative effect as a solvent is maintained. Likewise, compound B is also understood as a mixture of different non-solvents, as long as the effect as a non-solvent is maintained.

As compound A, i.e. as the solvent for the at least one vinylidene fluoride homopolymer or copolymer, preferably glycerin triacetate, glycerin diacetate, 2-(2-butoxyethoxy-) ethyl acetate, dibutyl phthalate, adipic acid diethyl ester, adipic acid dibutyl ether, butyl diglycol acetate, butyl glycol acetate, glycol diacetate, propylene carbonate, butyrolactone, or ε-caprolactam, or mixtures of the compounds mentioned are used. Particularly preferably, glycerin triacetate or a mixture of glycerin triacetate and ε-caprolactam is used for compound A. As compound B, i.e. as the non-solvent for the polymer component, dioctyl adipate, glycerin monoacetate, glycerin, glycol, diglycol, or castor oil, or mixtures thereof are well suited. Particularly preferred is the use of dioctyl adipate or castor oil or mixtures thereof.

The proportion of polymer required for the production of the membrane as well as the ratio of compound A to compound B in the solvent system can be determined by the generation of phase diagrams by means of simple tests. Phase diagrams of this type can be developed according to known methods, as described e.g. by C. A. Smolders, J. J. van Aartsen, A. Steenbergen, "Kolloid-Z. and Z. Polymere", 243 (1971), pp. 14-20. As a rule, for a predetermined solvent A, the proportion of compound B, i.e. the non-solvent in the mixture made of the polymer component, compound A, and compound B, is dependent on the strength of the non-solvent, i.e. of compound B. Preferably the proportion of compound B in the solvent system is 1 to 45 wt. %.

According to the invention, the concentration of the at least one vinylidene fluoride homopolymer or copolymer in the homogeneous solution lies between 20-60 wt. % and the concentration of the solvent system between 80-40 wt. %. In a preferred embodiment of the method according to the invention, the proportion of the polymer component is 30-50 wt. % and the proportion of the solvent system, consisting of compounds A and B, is 70-50 wt. %. If necessary, additional materials can be added to the polymer component, compounds A and B, or also the polymer solution, such as antioxidants, nucleating agents, extenders, components for improving biocompatibility, i.e. the blood compatibility during use of the membrane in oxygenation, e.g. vitamin E, and the like.

To form the hollow-fiber membranes, the polymer solution is extruded through the annular gap of a hollow-fiber die and the hollow fiber is formed. A fluid is metered through the central bore of the hollow-fiber die, said fluid functioning as the inner filling which forms and stabilizes the lumen of the hollow fiber or the hollow-fiber membrane. The extruded hollow fiber or the resulting hollow-fiber membrane then has a surface facing the lumen, which is the inner surface, and a surface facing away from the lumen, separated from the inner surface by the wall of the hollow fiber or hollow-fiber membrane, which is the outer surface.

Liquids such as glycerin or a 1:1 mixture made of dioctyl adipate and castor oil, or also a gas such as nitrogen or air are possibilities for the inner filling. Preferably nitrogen is used as the inner filling.

According to the invention, after formation in the hollow-fiber die, the hollow fiber is brought for cooling into contact at its outer surface with a liquid cooling medium which does not react chemically with the polymer component, which cooling medium is a strong non-solvent for the polymer component, and which contains compound B, which is also used to produce the homogeneous solution made of the polymer component and solvent system. In the context of the present invention, the liquid cooling medium is to be classified as a strong non-solvent, if the demixing temperature of a system consisting of 30 wt. % of the polymer component, 40 wt. % of compound A used as a solvent, and 30 wt. % of the cooling medium lies, in relation to the solidification temperature, at least 25% above the solidification temperature of this system.

The demixing or phase separation temperature can thereby be determined in a simple way, in that initially a homogeneous solution made of 30 wt. % of the polymer component is produced in 40 wt. % of compound A used as a solvent and 30 wt. % of the liquid cooling medium, and this solution is then heated to a temperature that lies approx. 20° C. above the dissolving temperature. The solution is then held for approx. 0.5 h at this temperature while stirring in order to guarantee a sufficient homogeneity. Subsequently, the solution is cooled at a cooling rate of 1° C./min while stirring. The temperature at which an initial turbidity can be visually observed is determined as the phase separation temperature. During further cooling, a gelation of the polymer-rich phase occurs at the solidification temperature.

For the formation of the structure required for the hollow-fiber membranes according to the invention, the strength of the non-solvent characteristic of the cooling medium in relation to the polymer component is of critical importance. Cooling media that fulfill the condition according to the invention, i.e. are, in the terminology of the present invention, strong non-solvents in relation to the polymer component, lead to the structure according to the invention. Cooling media that are indeed non-solvents for the polymer component but do not fulfill the condition according to the invention, i.e. for non-solvents for which the demixing temperature of a system consisting of 30 wt. % of the polymer component, 40 wt. % of compound A used as a solvent, and 30 wt. % of the cooling medium lies, in relation to the solidification temperature, less than 25% above the solidification temperature of this system, are thus weak non-solvents and do not lead to the structure according to the invention. In a preferred embodiment of the method of the invention, a cooling medium is used for which the demixing temperature of a system consisting of 30 wt. % of the polymer component, 40 wt. % of compound A used as a solvent, and 30 wt. % of the cooling medium lies, in relation to the solidification temperature, at least 40% above the solidification temperature of this system.

It has been found that in cases in which a weak non-solvent is used as the cooling medium, or also a solvent that for example dissolves the polymer component at temperatures at or above the die temperature, the resulting membrane no longer has the desired structure. At decreasing temperature differences, i.e. at decreasing strength of the non-solvent characteristic of the cooling medium, spherulitic structures occur namely to an increasing degree in the outer surface and also in the membrane wall. This leads primarily to insufficient mechanical characteristics of the hollow-fiber membranes and especially to comparatively low breaking tenacities.

It is essential to the invention that the cooling medium contains compound B. By this means, a mass transfer between the hollow fiber extruded from the hollow-fiber die and the cooling medium can occur, which is especially conducive to the formation of the membrane structure according to the invention and especially for the formation of the separating layer and the structure of the outer surface of the membrane of the invention. In a particularly preferred embodiment, the proportion of compound B in the cooling medium is at least 50 wt. %.

It is particularly advantageous if compound B itself is a strong non-solvent for the polymer component, whereby, in an analogous way as for the cooling medium, the condition for a strong non-solvent applies such that the demixing temperature of a system which consists of 30 wt. % of the polymer component, 40 wt. % of compound A used as a solvent, and 30 wt. % of compound B lies, in relation to the solidification temperature, at least 25% above the solidification temperature of this system.

In a further preferred embodiment of the method according to the invention, the cooling medium consists of a homogeneous mixture of components which are each a non-solvent for the polymer component, wherein the totality of the components, i.e. the cooling medium formed therefrom, must naturally be a strong non-solvent for the polymer component and fulfill the condition required according to the invention with regard to the difference between the demixing temperature and the solidification temperature.

For carrying out the method according to the invention, it is advantageous, especially with respect to the stability of the extruded hollow fiber, if the cooling medium has a viscosity in the range from 15 to 200 mPa s at 23° C. When using cooling media with viscosities of this type, an especially stable course of the formed hollow fiber through the cooling medium is achieved when carrying out the method of the invention.

In a preferred embodiment of the method according to the invention, the cooling medium consists of dioctyl adipate or mixtures of dioctyl adipate and castor oil. Particularly suitable are mixtures made from dioctyl adipate and castor oil in which the proportion of dioctyl adipate lies in the range from 75 to 95 wt. %. By varying the proportion of castor oil, a targeted adjustment of the viscosity of the cooling medium can be made.

It has proven to be advantageous if an air gap is present between the outlet surface of the hollow-fiber die and the cooling medium. By this means, the required temperature consistency at the hollow-fiber die is more easily achieved, than if the hollow-fiber die is in direct contact with the colder cooling medium. The air gap is preferably 5 to 40 mm and particularly preferably 8 to 15 mm.

To introduce a thermodynamic non-equilibrium liquid-liquid phase separation, the temperature of the cooling medium must lie significantly below the critical demixing temperature or phase separation temperature of the polymer solution used and additionally below the solidification temperature in order to solidify the polymer-rich phase. If a large difference exists between the demixing temperature and the temperature of the cooling medium, the formation of the separating layer is supported. Preferably, the cooling medium has a temperature that lies at least 100° C. below the phase separation temperature, and particularly preferably a temperature that lies at least 150° C. below the phase separation temperature. It is particularly advantageous if the temperature of the cooling medium is lower than 50° C. In individual cases, a cooling to temperatures below ambient temperature can be required.

Preferably, after exiting the hollow-fiber die, the hollow fiber is fed for cooling through a shaft or spinning tube in which the cooling medium is located. In so doing, the cooling medium and the hollow fiber are generally fed in the same direction through the shaft or spinning tube. Preferably, the hollow fiber and cooling medium traverse the shaft or spinning tube in the same direction, wherein the average linear speed of the cooling medium is at least 20% and particularly preferably at least 40% lower than the drawing off speed of the formed hollow fiber through the shaft or spinning tube. The average linear speed of the cooling medium is hereby understood as the volume flow of the cooling medium through the shaft or the spinning tube in relation to the cross-section of the shaft or the spinning tube. Method variations of this type are described for example in DE-A-28 33 493 or EP-A-133 882.

Following cooling and solidification of the polymer structure and thereby of the membrane structure, compounds A and B are generally removed from the molded body. The removal can take place for example through extraction. Preferably extraction agents of a type are used that do not dissolve the polymer or polymers but can be mixed with compounds A and B. Subsequently, a drying at increased temperatures can be necessary in order to remove the extraction agents from the membrane. Usable extraction agents are acetone, methanol, ethanol, and preferably isopropyl alcohol.

The invention is to be explained in more detail on the basis of the following examples and figures.

In the examples, the following methods were used for characterizing the membranes obtained:

Determination of Volume Porosity:

A sample of at least 0.5 g of the membrane to be examined is dry weighed. The membrane sample is subsequently placed in a liquid that moistens the membrane material, however without causing swelling, for 24 hours such that the liquid penetrates into all pores. This is visually discernible in that the membrane sample changes from an opaque to a glassy, transparent state. The membrane sample is subsequently removed from the liquid, liquid adhering to the membrane sample is removed by centrifuging at approx. 1800 g, and the mass is determined of the membrane sample thus pre-treated, i.e. liquid-filled.

The volume porosity in % is determined according to the following formula.

$$\text{Volume porosity } [\%] = 100 \cdot \frac{(m_{wet} - m_{dry})/\rho_{liquid}}{(m_{wet} - m_{dry})/\rho_{liquid} + m_{dry}/\rho_{polymer}}$$

where:
$m_{dry}$=weight of the dry membrane sample
$m_{wet}$=weight of the wet, liquid-filled membrane sample
$\rho_{liquid.}$=density of the liquid used
$\rho_{polymer}$=density of the membrane polymer Determination of Nitrogen Permeability:

A test cell is produced from approx. 15 to 20 hollow-fiber membrane pieces each with a length of approx. 30 cm. The hollow fibers are laid in a loop and both ends are embedded in a polyurethane resin. After curing of the resin, the embeddings are cut to a length of approx. 30 mm, wherby the lumina of the hollow-fiber membranes are opened by the cut. The hollow-fiber lumina in the embeddings must be verified as open. The test cell is incorporated in a testing apparatus and impinged with nitrogen at a defined test pressure of 2.0 bar.

The volume flow of the gas passing through the wall of the membrane sample is determined and normalized with respect to the test pressure and the surface of the membrane sample through which the gas flows, wherein the outside of the hollow fiber membranes is used. The resulting value in ml/(cm²·min·bar) is the permeability for nitrogen.

Determination of Breaking Force and Elongation at Break:

Measuring the breaking force of the hollow-fiber membranes is carried out using a standard, universal testing machine from Zwick in Ulm.

The hollow-fiber membrane sample is stretched at a constant speed in the longitudinal direction until it breaks. The force required for this is measured as a function of the change in length and retained in a force/elongation curve. The measurement is carried out as multiple determinations on a plurality of hollow-fiber membrane samples at 100 mm clamping length and at a traction speed of 500 mm/min. The pretension weight is 2.5 cN. The force BK required for break is given as a average numeric value in cN.

The breaking strength $\sigma_B$ of the hollow-fiber membrane sample is obtained by normalizing the breaking force BK to the cross-sectional area $A_Q$ of the membrane wall.

Determination of the Average Roughness $R_a$

The topography of the surface of a 10×10 µm section of the membrane surface is examined by means of atomic force microscopy using a very fine needle and a complete three-dimensional information is obtained about the topography of the surface. The roughness parameters are calculated from the measurement data obtained, based on DIN EN ISO 4287. To characterize the surface roughness of the present hollow-fiber membranes, the average roughness $R_a$ is determined as the arithmetic mean of the magnitudes of the distances of all roughness profile values from the center line, measured across the surface.

EXAMPLE 1

PVDF granulate of the type Solef 1012 from Solvay Solexis was melted in an extruder at 235-245° C. The polymer melt was mixed in a mixer with a solvent system consisting of 50 wt. % glycerin triacetate (component A) and 50 wt. % dioctyl adipate (component B) at 230-245° C. and subsequently processed to a homogeneous solution. The polymer proportion was set at 35 wt. %.

This solution was fed into a hollow-fiber die conditioned to 220° C. and extruded above the phase separation temperature into a hollow fiber. Nitrogen was used as the inner filling. After an air gap of 5 mm, the hollow fiber traversed an approx. 2 m long spinning tube, through which flowed a cooling medium conditioned to ambient temperature. A mixture of dioctyl adipate and castor oil in a ratio of 90:10 was used as the cooling medium. For this cooling medium, the demixing temperature of the system consisting of 30 wt. % of the polymer component, 40 wt. % of compound A (glycerin triacetate) used as a solvent, and 30 wt. % of the cooling medium lies, in relation to the solidification temperature, at approx. 53% above the solidification temperature of this system.

The hollow fiber, solidified as a result of the cooling in the spinning tube, was drawn at a drawing speed of 70 m/min from the spinning tube, wound on a spool, subsequently extracted using isopropyl alcohol heated to approx. 60° C., and then dried online in a convection oven at approx. 115° C.

The hollow-fiber membranes produced in this way had an external diameter of 304 µm and a wall thickness of 43 µm. A value of 40 ml/(cm²·min·bar) was determined for nitrogen permeability. The breaking strength of the hollow-fiber membrane was 26 N/mm², and the elongation at break was 429%.

Figure 1:
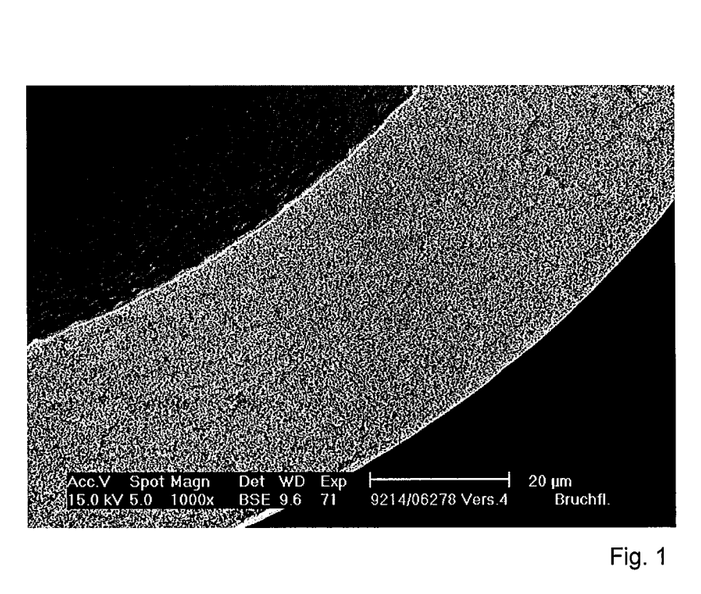
FIG. 1 shows a scanning electron microscopic (SEM) image of the fracture surface of a hollow-fiber membrane according to Example 1 perpendicular to its longitudinal axis at 1000 times magnification.
Figure 2:
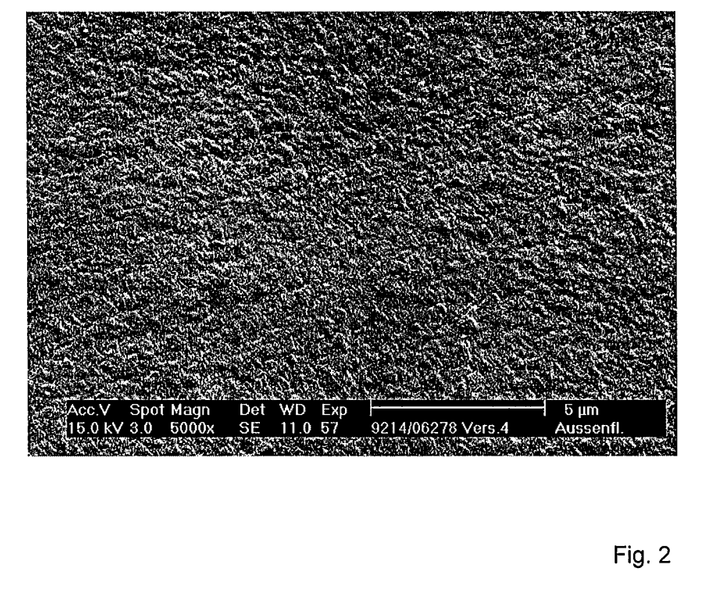
FIG. 2 shows a scanning electron microscopic (SEM) image of the outer surface of a hollow-fiber membrane according to Example 1 at 5000 times magnification.

According to the scanning electron microscopic (SEM) examination of the fracture surface of the hollow-fiber membrane, this hollow-fiber membrane has a very finely pored structure across its wall (FIG. 1). SEM images of the outer surface of the membrane at 5000 times magnification show a homogeneous, uniform and relatively even structure of the surface, which in addition is pore-free (FIG. 2).

Figure 3:
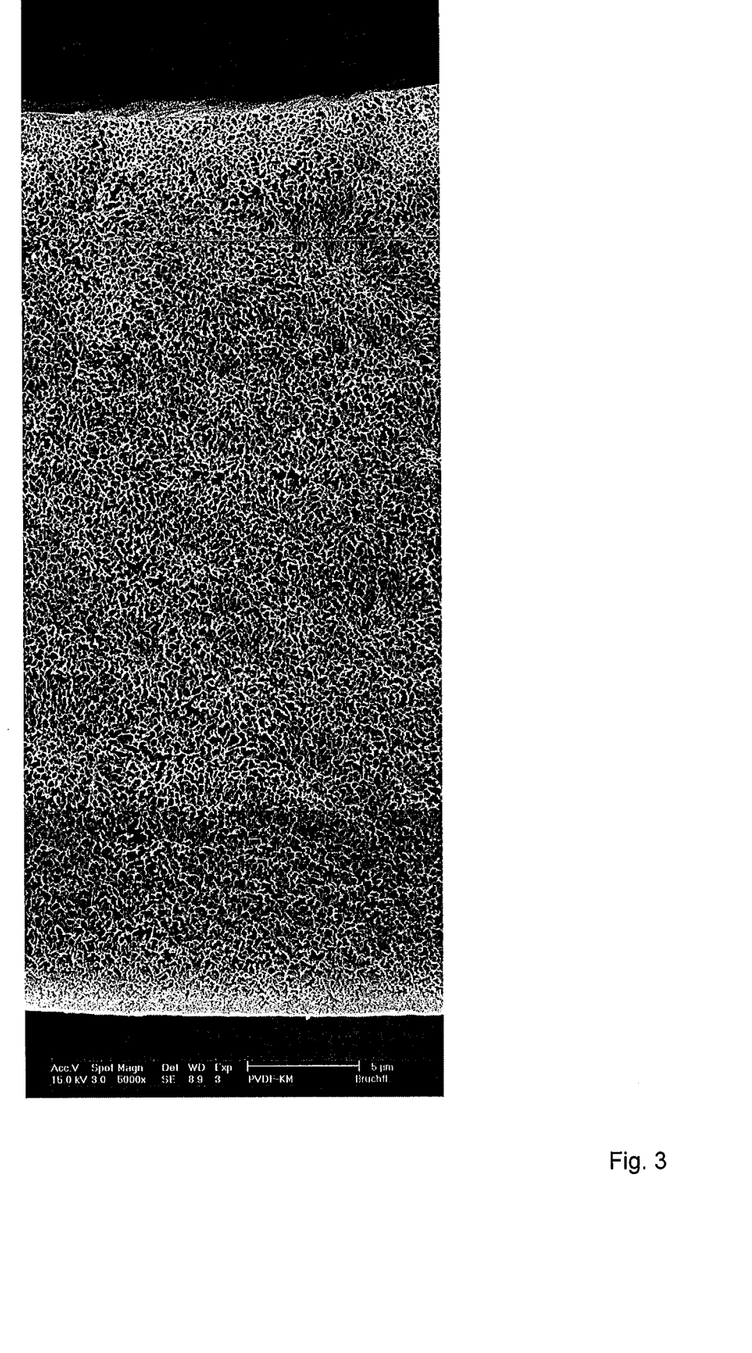
FIG. 3 shows a scanning electron microscopic (SEM) image of the fracture surface of a hollow-fiber membrane according to Example 1 perpendicular to its longitudinal axis at 5000 times magnification.

The SEM image of the entire cross section of the membrane wall at 5000 times magnification clearly shows a microporous supporting layer, free of finger pores, substantially extending across the entire cross section, with a sponge-like, open-pored pore structure that is substantially isotropic across the wall thickness, wherein the pores in this supporting layer have on average a size smaller than 0.1 µm (FIG. 3). At the lower edge of the image in FIG. 3, an approx. 0.15 µm thick separating layer is discernible, located on the outer surface of the membrane.

Figure 4:
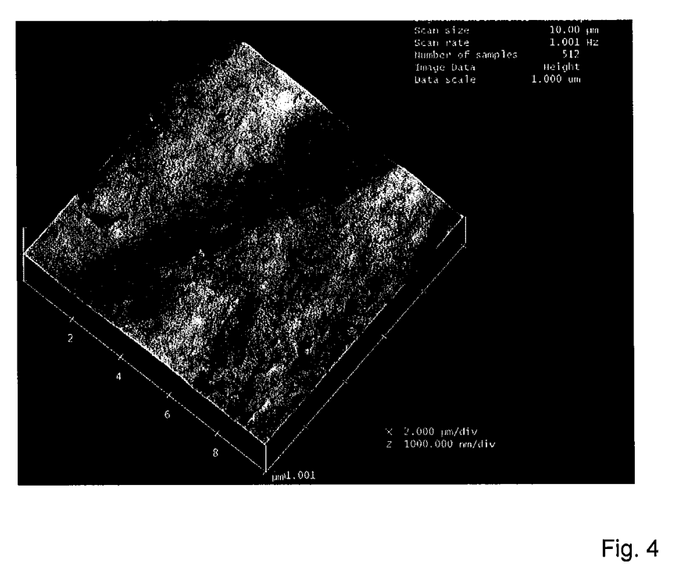
FIG. 4 shows a 3D image of a 10×10 µm sample of the outer surface of a hollow-fiber membrane according to Example 1, determined via atomic force microscopy.

On examination of the outer surface of the hollow-fiber membrane by means of atomic force microscopy, an average roughness $R_a$ of 40 nm was determined. FIG. 4 shows a 3D view of a 10×10 µm sample of the hollow-fiber membrane outer surface, from which a uniform and even surface structure is discernible.

EXAMPLE 2

A hollow-fiber membrane was produced as in Example 1, wherein a mixture of 40 wt. % glycerin acetate and 60 wt. % dioctyl adipate was used as the solvent system. The polymer concentration was likewise set at 35 wt. %. Based on the higher proportion of dioctyl adipate, the polymer solution of this example had a higher demixing temperature in comparison to that of Example 1.

The hollow-fiber membrane had an external diameter of 350 µm and a wall thickness of 51 µm. A value of 46 ml/(cm²·min·bar) was determined for nitrogen permeability. The breaking strength of the hollow-fiber membrane was 19.6 N/mm², and the elongation at break was 366%.

Figure 5:
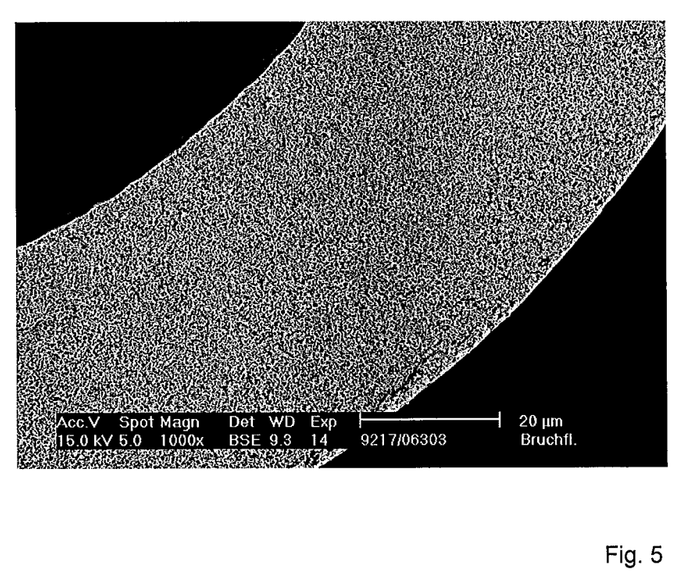
FIG. 5 shows a scanning electron microscopic (SEM) image of the fracture surface of a hollow-fiber membrane according to Example 2 perpendicular to its longitudinal axis at 1000 times magnification.

According to the scanning electron microscopic (SEM) examination of the fracture surface of the hollow-fiber membrane, this hollow-fiber membrane likewise showed a very finely pored structure across the wall (FIG. 5).

Figure 6:
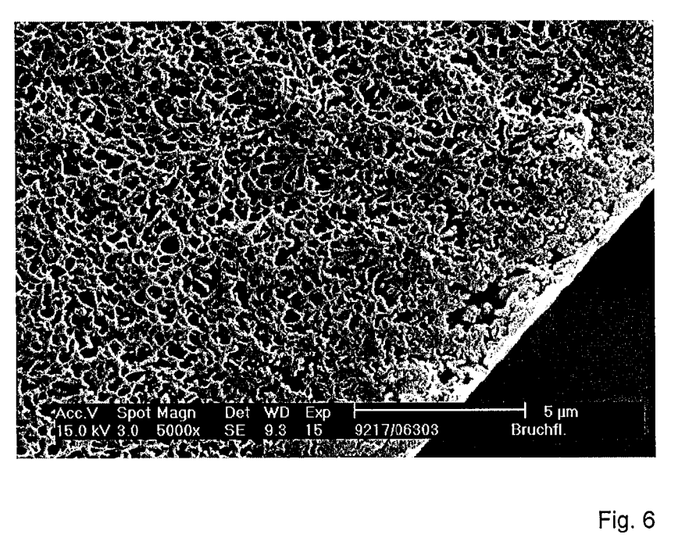
FIG. 6 shows a scanning electron microscopic (SEM) image of the fracture surface of a hollow-fiber membrane according to Example 2 perpendicular to its longitudinal axis at 5000 times magnification, section in the area of the outer side.
Figure 7:
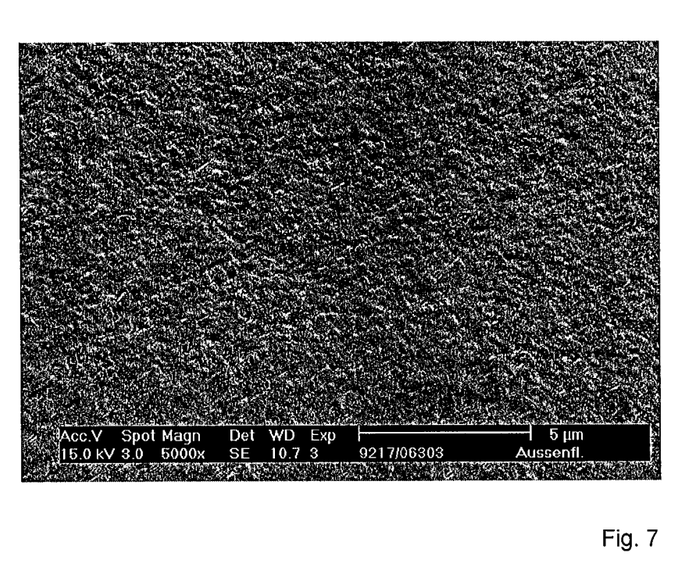
FIG. 7 shows a scanning electron microscopic (SEM) image of the outer surface of a hollow-fiber membrane according to Example 2 at 5000 times magnification.

According to FIG. 6, which shows a section of the outer region of the membrane wall, the membrane had a separating layer on its outer surface with a thickness of approx. 0.1 μm. The SEM image of the outer surface of the membrane at 5000 times magnification shows, as in the membrane from Example 1, a homogeneous, uniform and relatively even structure of the surface, which in addition is pore-free (FIG. 7). The average roughness $R_a$, determined via atomic force microscopy, corresponds to that of the membrane from Example 1.

COMPARISON EXAMPLE 1

A hollow-fiber membrane was produced as in Example 1, wherein however a mixture of glycerin acetate and dioctyl adipate at a ratio of 50:50 was used as the cooling medium. For this cooling medium, the demixing temperature of the system consisting of 30 wt. % of the polymer component, 40 wt. % of compound A (glycerin triacetate) used as a solvent, and 30 wt. % of the cooling medium lies, in relation to the solidification temperature, at approx. 5% above the solidification temperature of this system.

The hollow-fiber membrane had an external diameter of 313 μm and a wall thickness of 49 μm. A value of 75 ml/(cm$^2$·min·bar) resulted for nitrogen permeability.

Figure 8:
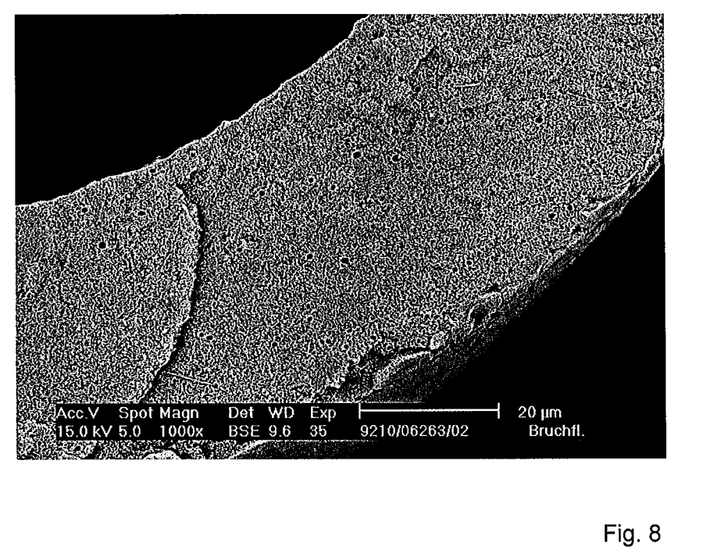
FIG. 8 shows a scanning electron microscopic (SEM) image of the fracture surface of a hollow-fiber membrane according to Comparison example 1 perpendicular to its longitudinal axis at 1000 times magnification.
Figure 9:
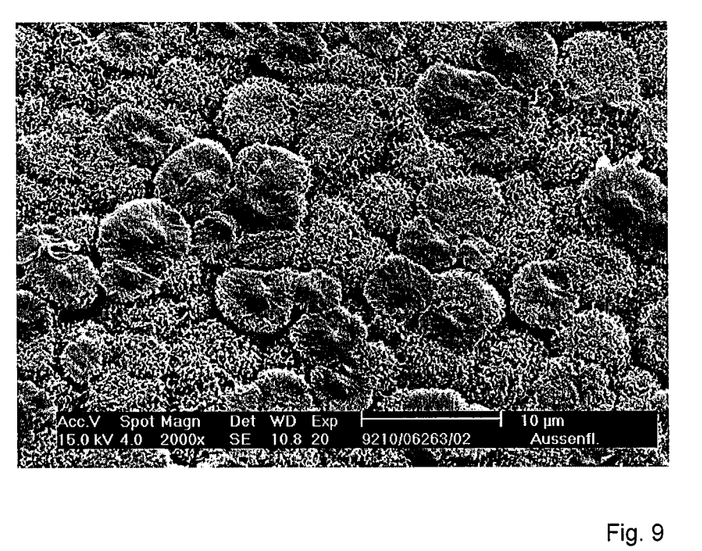
FIG. 9 shows a scanning electron microscopic (SEM) image of the outer surface of a hollow-fiber membrane according to Comparison example 1 at 2000 times magnification.
Figure 10:
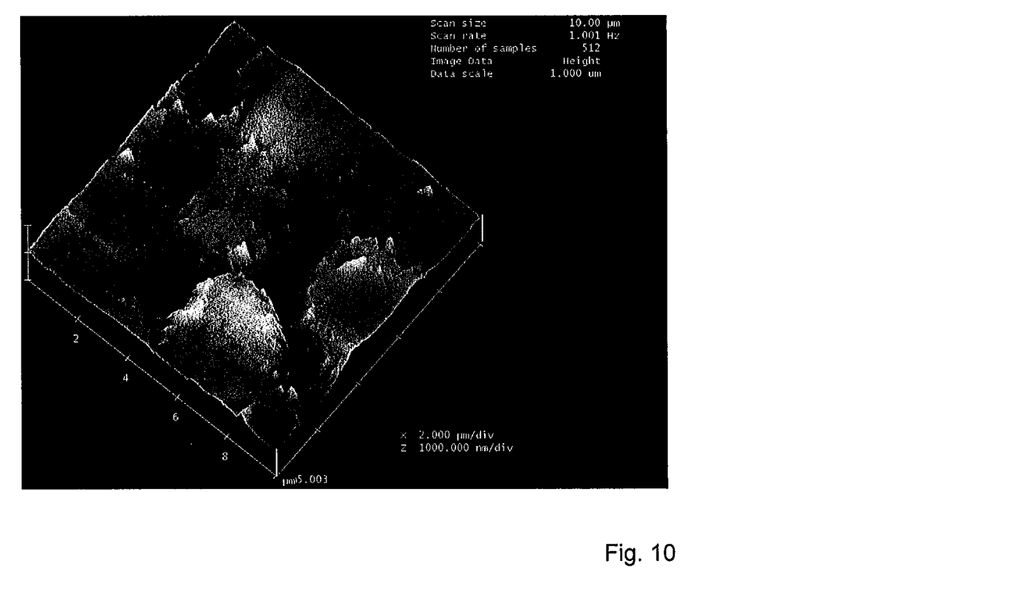
FIG. 10 shows a 3D image of a 10×10 µm sample of the outer surface of a hollow-fiber membrane according to Comparison example 1, determined via atomic force microscopy.

According to the scanning electron microscopic (SEM) examination of the fracture surface of the hollow-fiber membrane, this hollow-fiber membrane indeed likewise has a very finely pored structure across the wall (FIG. 8), which, however, has isolated imperfections. Spherulitic structures are clearly discernible in the SEM image of the outer surface of this membrane at 5000 times magnification (FIG. 9). At the same time, the hollow-fiber membrane of this comparison example, with a breaking strength of 11 N/mm$^2$ and an elongation at break of 119%, shows relatively low mechanical strength. Based on the strongly structured surface, as can be seen in FIG. 9, the average roughness $R_a$, as determined via atomic force microscopy, is approx. 145 nm. FIG. 10 shows a 3D view of a 10×10 μm sample of the outer surface of the hollow-fiber membrane from this comparison example, which likewise indicates a pronounced surface structure with deep, valley-shaped indentations between spherulites, which manifest as upheavals.

COMPARISON EXAMPLE 2

A hollow-fiber membrane was produced as in Example 1; however, pure glycerin triacetate was used as the cooling medium, and was also used as the solvent (component A) for producing the polymer solution. The cooling medium therefore had no non-solvent character.

The hollow-fiber membrane thus produced had an external diameter of 320 μm and a wall thickness of 50 μm. A value of 78 ml/(cm$^2$·min·bar) resulted for nitrogen permeability.

Figure 11:
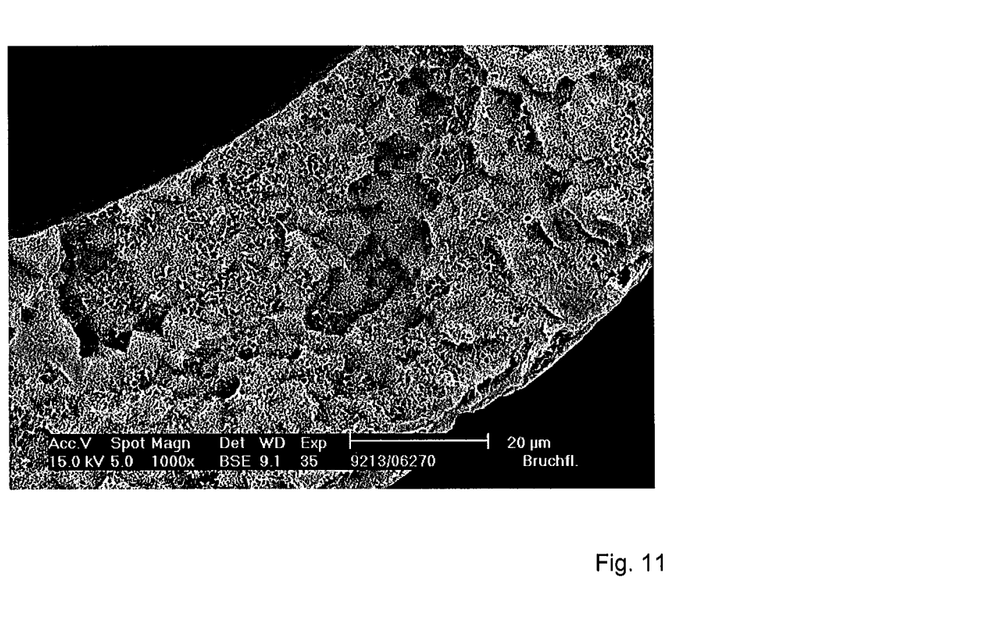
FIG. 11 shows a scanning electron microscopic (SEM) image of the fracture surface of a hollow-fiber membrane according to Comparison example 2 perpendicular to its longitudinal axis at 1000 times magnification.
Figure 12:
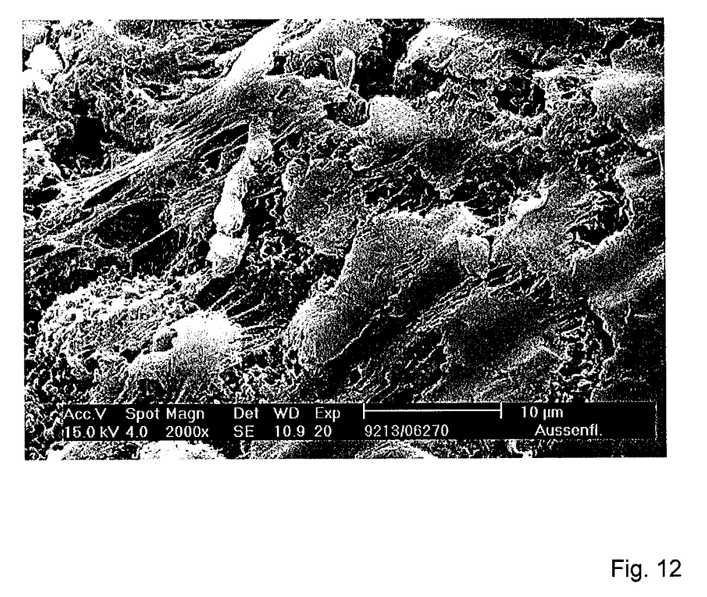
FIG. 12 shows a scanning electron microscopic (SEM) image of the outer surface of a hollow-fiber membrane according to Comparison example 2 at 2000 times magnification.

According to the scanning electron microscopic (SEM) examination of the fracture surface of the hollow-fiber membrane, this hollow-fiber membrane likewise showed a very finely pored structure across the wall (FIG. 11); however, the appearance of the fracture already is indicative of significant spherulitic regions within the membrane wall. According to the SEM image of the outer surface of the membrane at 5000 times magnification shown in FIG. 12, the surface is irregular and non-homogeneous to a large degree and pronounced structural elements are discernible, between which lie to some extent areas that have pores extending to the surface, and the porous structure of the supporting layer is discernible. At the same time, the hollow-fiber membrane of this comparison example shows only low mechanical strengths and elongations. Due to the strongly structured surface, the average roughness $R_a$ lies significantly above 100 nm.

EXAMPLES 3 TO 5, COMPARISON EXAMPLES 3 TO 5

A hollow-fiber membrane was produced as in Example 1; however, by varying the composition of the cooling medium through different proportions of glycerin triacetate (solvent), dioctyl adipate (non-solvent), and castor oil (non-solvent), its non-solvent character was changed.

The compositions of the cooling media used in these examples and comparison examples are listed in Table 1. These cooling media were at first examined with respect to their non-solvent characteristics. For this purpose, in each case a model system consisting of 30 wt. % of the polymer component, 40 wt. % of compound A (glycerin triacetate) used as a solvent, and 30 wt. % of the respective cooling medium was examined with respect to the demixing temperature and the solidification temperature, and with respect to the resulting difference between the demixing temperature in relation to the solidification temperature, expressed as a percentage.

During the spinning of hollow-fiber membranes when using these cooling media, it is shown that, when using cooling media which are classified as strong non-solvents (Examples 3 to 5) according to the definition of the present invention, hollow-fiber membranes were obtained whose outer surfaces had a homogeneous, uniform structure without pores. The cooling media used in Comparison examples 3 to 5 are, in contrast, not classified within the context of the invention as strong non-solvents in relation to the polymer component. The hollow-fiber membranes obtained thereby show an outer surface with spherulitic structural elements. Accordingly, the hollow-fiber membranes of Comparison examples 3 to 5 also had only insufficient mechanical characteristics with low strengths and low elongations.

TABLE 1

Examination of the non-solvent characteristic of the cooling media

| | Polymer content PVDF [wt. %] | Proportion of glycerin triacetate [wt. %] | 30 wt. % Cooling medium T:DOA:R | Demixing temperature [° C.] | Solidification temperature [° C.] | ΔT [%] |
|---|---|---|---|---|---|---|
| Example 3 | 30 | 40 | 0:90:10 | 180 | 118 | 53 |
| Example 4 | 30 | 40 | 10:80:10 | 180 | 118 | 53 |
| Example 5 | 30 | 40 | 20:70:10 | 153 | 118 | 30 |
| Comparison example 3 | 30 | 40 | 30:60:10 | 143 | 118 | 21 |

TABLE 1-continued

Examination of the non-solvent characteristic of the cooling media

| | Polymer content PVDF [wt. %] | Proportion of glycerin triacetate [wt. %] | 30 wt. % Cooling medium T:DOA:R | Demixing temperature [° C.] | Solidification temperature [° C.] | ΔT [%] |
|---|---|---|---|---|---|---|
| Comparison example 4 | 30 | 40 | 40:50:10 | 119 | 112 | 6 |
| Comparison example 5 | 30 | 40 | 50:50:0 | 115 | 110 | 5 |

(T = glycerin triacetate; DOA = dioctyl adipate; R = castor oil; ΔT = difference between demixing temperature and solidification temperature in percent, relative to the solidification temperature)

The invention claimed is:

1. A hydrophobic, integrally asymmetrical hollow-fiber membrane made of a vinylidene fluoride homopolymer or copolymer, which has a wall with an outer surface on its outer side and an inner surface on its inner side and a wall thickness, and a lumen enclosed by the inner side, wherein the wall of said hollow-fiber membrane has a microporous supporting layer with a sponge-like, open-pored, pore structure that is essentially isotropic across the wall thickness and without finger pores, and wherein said supporting layer extends across at least 90% of the wall thickness and has pores with an average diameter of less than 0.5 μm, characterized in that the hollow-fiber membrane has in the wall a separating layer adjacent to the supporting layer on the outer surface thereof with a thickness in the range from 0.01 to 5 μm and a structure that is denser in contrast to the supporting layer, and the outer surface under scanning electron microscopic examination at 5000 times magnification has a homogeneous, uniform structure without pores, said hollow-fiber membrane has a porosity in the range from 40 to 80 vol. %, a wall thickness in the range from 25 to 100 μm, and a lumen diameter in the range from 100 to 500 μm, and the permeability for nitrogen is at least 25 ml/(cm$^2$·min·bar), and the elongation at break is at least 250%.

2. The hollow-fiber membrane according to claim 1, characterized in that the average diameter of the pores in the supporting layer is less than 0.1 μm.

3. The hollow-fiber membrane according to claim 1, characterized in that the porosity lies in the range from 45 to 60 vol. %.

4. The hollow-fiber membrane according to claim 1, characterized in that it has an elongation at break of at least 300%.

5. The hollow-fiber membrane according to claim 1, characterized in that the separating layer has a thickness in the range from 0.01 to 0.6 μm.

6. The hollow-fiber membrane according to claim 1, characterized in that the outer surface has an average roughness $R_a$ of less than 100 nm as determined by means of atomic force microscopy.

7. A method for producing a hollow-fiber membrane according to claim 1, comprising at least the steps:

a) production of a homogeneous solution of 20-60 wt. % of a polymer component consisting of at least one vinylidene fluoride homopolymer or copolymer in 80-40 wt. % of a solvent system, wherein the solution made from the polymer component and solvent system upon cooling has a critical demixing temperature and a solidification temperature and a miscibility gap below the critical demixing temperature in the liquid state of aggregation, b) shaping the solution into a hollow fiber with an outer surface on its outer side and an inner surface on its inner side in a hollow-fiber die which has a die temperature above the critical demixing temperature, c) cooling the hollow fiber by means of a cooling medium, which is conditioned to a cooling temperature below the solidification temperature, at such a rate that a thermodynamic non-equilibrium liquid-liquid phase separation into a polymer-rich and a polymer-poor phase takes place, and subsequently, on passing below the solidification temperature, solidification of the polymer-rich phase takes place, d) removal of the solvent system from the hollow fiber, if necessary, characterized in that the solvent system contains a compound A and a compound B which are liquid and can be mixed homogeneously with each other at the dissolving temperature, and wherein a solvent for the polymer component is selected for compound A and a non-solvent for the polymer component is selected for compound B, the hollow fiber is brought for cooling into contact at its outer surface with a liquid cooling medium which does not react chemically with the polymer component and which is a strong non-solvent for the polymer component, for which non-solvent the demixing temperature of a system which consists of 30 wt. % of the polymer component, 40 wt. % of the compound A used as a solvent, and 30 wt. % of the cooling medium lies, in relation to the solidification temperature, at least 25% above the solidification temperature of this system, and the cooling medium contains compound B.

8. The method according to claim 7, characterized in that the proportion of compound B in the cooling medium is at least 50 wt. %.

9. The method according to claim 7, characterized in that the cooling medium consists of components that are each non-solvents for the polymer component.

10. The method according to claim 7, characterized in that the cooling medium has a viscosity in the range from 15 to 200 mPa s at 23° C.

11. The method according to claim 7, characterized in that, after exiting from the hollow-fiber die, the hollow fiber is fed for cooling through a spinning tube in which the cooling medium is located, wherein the hollow fiber and the cooling medium traverse the spinning tube in the same direction and wherein the average linear speed of the cooling medium is at least 20% lower than the drawing speed of the shaped hollow fiber through the spinning tube.

12. The method according to claim 7, characterized in that glycerin triacetate or glycerin diacetate or mixtures thereof are used as compound A.

13. The method according to claim 7, characterized in that dioctyl adipate, castor oil or mixtures thereof are used as compound B.

14. The method according to claim 7, characterized in that the cooling medium is such that the demixing temperature of a system consisting of 30 wt. % of the polymer component, 40 wt. % of compound A used as a solvent, and 30 wt. % of the cooling medium lies, in relation to the solidification temperature, at least 40% above the solidification temperature of this system.

* * * * *